J. HAZELTON.
Seed Planter.
No. 17,275.
Patented May 12, 1857.
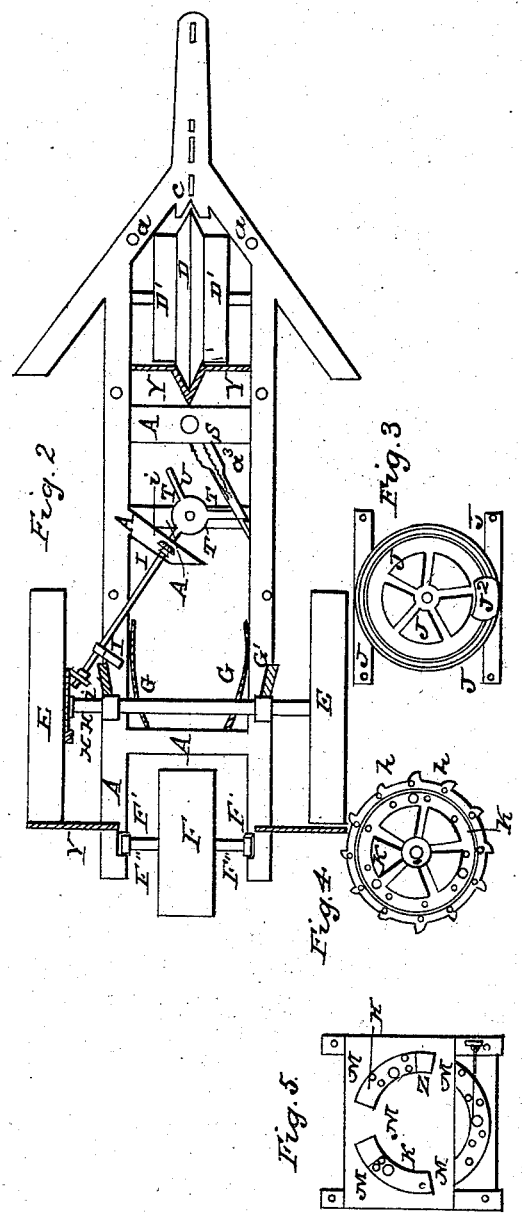
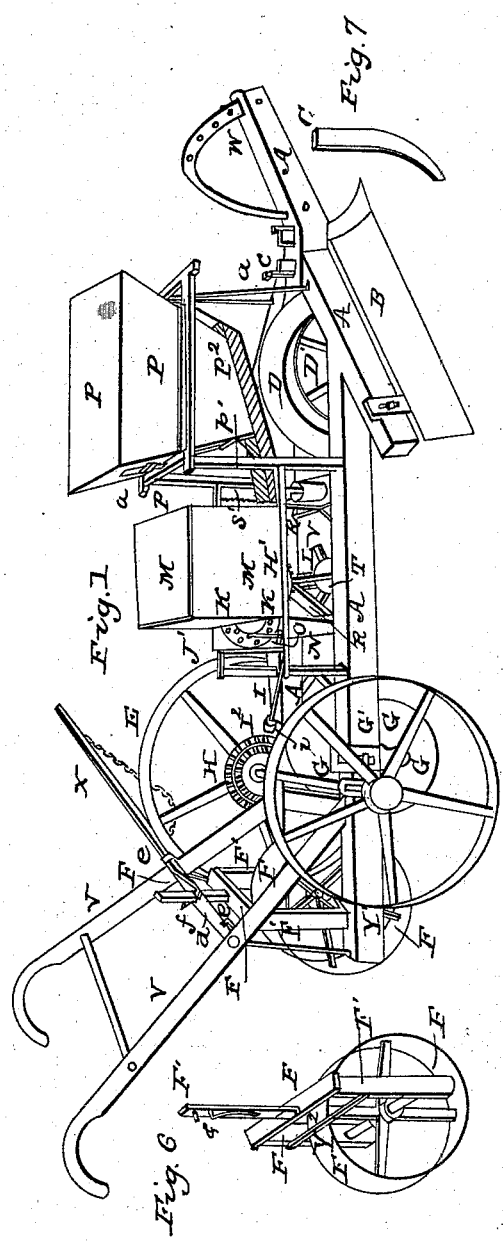

UNITED STATES PATENT OFFICE.

JOHN HAZELTON, OF ORFORD, NEW HAMPSHIRE.

IMPROVEMENT IN SEED-PLANTERS.

Specification forming part of Letters Patent No. 17,275, dated May 12, 1857.

*To all whom it may concern:*

Be it known that I, JOHN HAZELTON, of Orford, in the county of Grafton and State of New Hampshire, have invented a certain new and useful Improvement in the Mode of Constructing Seed-Planters, of which the following is a full, clear, and exact description of the construction and operation of the same, reference being had to the accompanying drawings and letters, making part of the specification.

The nature of my invention consists in applying to the after part of a seeding-machine the frame and roller hereinafter described, for the treble purpose of covering seed, stopping the operation of seeding, and serving as a rear bearing-wheel to transport the machine.

To enable others skilled in the art to make, construct, and use my invention, I will now proceed to describe it in detail.

Figure 1 is a perspective view of this machine; Fig. 2, a horizontal view of the base without the superstructure; Fig. 3, the reversed bottom of the seed-box; Fig. 4, the cammed gage-wheel; Fig. 5, the top view of the seed-box, M; Fig. 6, the hind roller or wheel and frame; Fig. 7, the shape of the front knife, C.

A A represent the skeleton or frame, to which all the fixtures are attached; B, the front clearer or ridger, the extreme front part of which is made of cast-iron.

B B are the attachments of two thin steel plates, peculiarly curved and shaped, so as to fully develop my principle, which is to nicely clear the ground from all obstructions, leaving the surface smooth and level, a little more than the distance between the main bearing-wheels E E; hence gives free action to the flange-wheel D, so that the furrow is properly made, and leaves all the loose obstructing matter, which is moved in a neat compost ridge between the rows, by which the growth and often cultivation of crops is greatly facilitated. This ridger or clearer B is so adjusted that it can be easily raised or lowered and firmly secured when adjusted.

C is a knife curving backward immediately before the flange-wheel D, intended to cut through any obstruction beneath the surface that was not cleared away by the ridger B, giving a perfect free action to the flange-wheel D, that makes the furrow or drill. The flange-wheel D serves also as the forward bearing of the machine. One of the superiorities of this flange-wheel D is that while a uniform furrow can be made with it the horizontal part of the face presses upon the sides of the furrow, crushing all the lumps, pulverizing the soil, leaving it in a suitable condition to cover the seed, so that it may germinate free from lumpy obstructions.

E E are the main bearing-wheels, whose forward movements set the whole working part of the machine in motion by means of the bevel-gears H H and the connecting-arbor I, on which the bevel-gears $i$ $i$—one on each end—are attached, that play in the gears H H.

The main wheels E E can be raised from the ground by the simple means I have applied to the machine, so as to suspend the working operation of the machine with ease and almost the rapidity of thought, and can be as quickly depressed by touching the spring &, so as to set the whole machine again in operation by means hereinafter described. Upon the front end of this machine, forward of the seed-box M, is affixed a fertilizing-hopper, P, for plaster-of-paris, ashes, guano, &c. The hopper is stationary, supported by the conical rod $a$ $a$ in front, the ends of which enter the main frame at $a$ $a$. The back end is supported by the pillars P' P'; but the trough or conductor underneath is suspended by spiral springs—the spiral spring S' attached to the lever R, and the trough $P^2$ and the standard attached to the frame A by means hereinafter described. The trough $P^2$ is kept in an oscillatory motion to insure the discharge of the fertilizer into the tube Q, which is closed by a sliding gate U, which is opened with mathematical precision by means of a spider, T, attached to the lower end of the vertical arbor L. As it revolves around, the ends hit the pin $i'$, attached to the slide-gate, which throws it back and opens the bottom of the tube Q, permitting the fertilizing material to drop in the hills in the furrow. A spiral spring, $a^3$, one end attached to the slide-gate, the other to the cross-piece A, quickly throws it back and closes the bottom again; $a'$, the gate to the hopper, by which means the discharge can be regulated.

Back of the fertilizing-hopper is the seed-box M, the shape of which is nearly a cube, from which the seed is regularly discharged. The stationary bed-wheel J is placed under the bottom of the seed-box M, and serves as a rest for the cammed gage-wheel K to run upon; also serves as a stationary bottom to the cavities which carry the seed around to where it is to be dropped. The top of the cam gage-wheel K forms a part of the bottom of the seed-box M. The seed naturally falling into the circular cavities in this wheel, they are carried around to the hole in the bed J, where they are dropped, passing into the conductor or leather tube N; and to insure the discharge of the seed, a dog or spring, O, is so arranged as to enter the cavities with sufficient force to insure the discharge of the seed into the leather tube N, through which the seed passes to the hills. The bottom of the box is so constructed that the tendency of the seed is to rest upon the wheel K and drop into the cavities. At two points on the bottom of the box are affixed the two steel springs Z Z to insure the filling of the cavities with the seed, and to prevent any seed from passing out of the box except what is in the cavities.

The stationary bed J is so constructed as to prevent all danger of its clogging. Should anything get between the bed J and the wheel K, it would immediately work out through the center of the bed J, as the most of the center is left open. There is in this bed J a cavity immediately over the seed-conductor sufficiently large to let the seed drop through that is brought around by the revolving wheel K. The object of the cams $h\ h\ h$ on the revolving wheel K, attached to the vertical arbor L, which passes through the stationary bed J, is to hit the lever R and produce an oscillatory motion to the fertilizing-trough $P^2$, to insure the certainty of its operation. Another important feature in the cammed gage-wheel K is that it can be quickly changed for one of a different number and size of holes, so as to drop large or small seeds—any required number—in the hills.

H H represent two sets of bevel-gears, each set containing two distinct gears, one of each inside of the other, one set affixed to the arbor of and near the left main bearing-wheel E, the other set affixed to the vertical arbor L, any two of which gears can act upon each of the end gears, $i\ i$, attached to the horizontal arbor I' at the same time; I', the wrought-iron arbor of the bevel-gears $i\ i$, with a bevel-gear on each end, one end affixed to the frame A A, near the arbor of the main bearing-wheel E, by means of a movable box, and secured by a nut or screw. The other end is affixed to the piece A in the frame A A, under the seed-box M. The gear on the end of this arbor I, next the main bearing-wheel E, is movably fastened by a pin, and can be slipped on the arbor at the pleasure of the operator, so as to act upon the outer or inner set of the gears H H, thus regulating the velocity of the cammed gage-wheel K and the distance between the hills. If this does not sufficiently regulate the distance between the hills, it can be readily done by changing the bevel-gears $i\ i$ on the arbor I by putting on some of greater or less diameter, as the boxes are movable and easily adjusted, which will fully accomplish the object.

G G represent two thin steel wheels concave on the side next the furrow, called the "coverers." They are attached in the vertical grooves G G outside the frame A A, held in their position by means of a nut or screw, the stands which hold the wheels acting through slots, as shown by the drawings. Those wheels can be raised or lowered so as to cover the seed any required depth. They set in a diagonal position. Their periphery being sharp, they cut through the obstructions beneath the surface that were not removed by the ridger or clearer B, and nicely pulverize the soil, rolling it inwardly upon and covering the seed at any required depth by raising or lowering these wheels G G. I call the attention to my arrangement of this hindmost or finishing roller and frame F', to which the roller F is attached, the frame and wheel serving a treble purpose—viz., to gently press down the soil which covers the seed, or serve as a hind bearing to take the weight off the hind end of the machine and stop the whole operation of seeding. There is nothing new in a hind roller to press down the seed or jam it into the ground; but by my arrangement this hind roller, F, has only its own weight and the frame that supports it, which plays up and down through the grooves F'' F'' in the hind end of the main frame A A, and through the slot O in the center of the cross-piece $d$, framed into the handles V V, thereby gently pressing down the soil over the seed and avoiding the injurious effects of the whole weight of the hind end of the machine. I have found that my means hastens the appearance of the sprouts on the surface and their after growth, as the soil is not baked down, but remains light. The second office of this hind roller is to take the whole weight of the hind end of the machine, at the option of the operator, by raising the hind end of the machine so that it shall rest on the spring &, which is attached to the upper end of the roller-frame F', that passes through the cross-piece $d$ in the slot $o$, leaving the hind bearing-wheels, E E, free from the ground, thereby stopping the whole working operation of the machine by touching the spring & again without stopping the motive power attached to the machine at the curved iron W. The hind wheel or roller, F, and the frame F', to which the roller F is attached, is quickly raised up by the weight of the machine and assumes its office again as a roller, the hind wheels, E E, again bearing the weight of the machine, which sets the working part again in motion. X is the movable arm attached to the cross-piece $d$, which supports the handles V V, resting across the handles V V, by a support attached at $e\ e$, on the outer end of which is attached a small chain for marking where the next row is to be, making them equidistant apart, and by changing the chain on the arm any required distance apart; Y scrapers to clean the wheels D, E, E, and F.

Having thus described the construction and operation of my invention, I do not claim the attachment to seed-planters of a hind or finishing roller to press down the soil over the seed; but

What I do claim is—

The arrangement of roller F and sliding frame F', substantially in the manner and for the purpose described.

In testimony whereof I hereunto set my hand this 20th day of February, 1857.

JOHN HAZELTON.

Witnesses:
 BENJ. F. COOKE,
 W. H. PERRIN.